(12) United States Patent
Bley et al.

(10) Patent No.: US 7,159,704 B2
(45) Date of Patent: Jan. 9, 2007

(54) HYDRAULIC SYSTEM

(75) Inventors: Roland Bley, Buehl (DE); Matthias Zink, Ottenhoefen (DE)

(73) Assignee: Luk Lamellen Und Kupplungsbau Beteiligungs KG, Buehl (DE)

( * ) Notice: Subject to any disclaimer, the term of this patent is extended or adjusted under 35 U.S.C. 154(b) by 130 days.

(21) Appl. No.: 10/869,091

(22) Filed: Jun. 16, 2004

(65) Prior Publication Data

US 2005/0006195 A1 Jan. 13, 2005

(30) Foreign Application Priority Data

Jul. 10, 2003 (DE) ................. 103 31 415

(51) Int. Cl.
*F16D 25/06* (2006.01)
(52) U.S. Cl. ............ 192/91 R; 192/85 C; 60/574
(58) Field of Classification Search ........... 192/85 C, 192/91 R; 60/574
See application file for complete search history.

(56) References Cited

U.S. PATENT DOCUMENTS

| | | | | |
|---|---|---|---|---|
| 2,311,787 A | * | 2/1943 | Swift ................. | 60/578 |
| 2,317,601 A | * | 4/1943 | Fowler ............... | 60/578 |
| 2,317,604 A | * | 4/1943 | Hamilton ............ | 188/349 |
| 2,343,900 A | * | 3/1944 | Groves ............... | 60/576 |
| 2,593,192 A | * | 4/1952 | Rockwell ........... | 60/563 |
| 5,060,776 A | | 10/1991 | Skog et al. ......... | 192/85 R |
| 5,127,506 A | | 7/1992 | Müller et al. ....... | 192/85 C |

FOREIGN PATENT DOCUMENTS

| | | |
|---|---|---|
| DE | 43 20 205 | 12/1994 |
| DE | 199 19 339 | 11/1999 |
| EP | 1 424 504 | 6/2004 |
| GB | 1 197 320 | 7/1970 |
| GB | 2 279 125 | 12/1994 |
| RU | 2 224 921 | 2/2004 |

\* cited by examiner

*Primary Examiner*—Saul Rodriguez
(74) *Attorney, Agent, or Firm*—Davidson, Davidson & Kappel, LLC

(57) ABSTRACT

A hydraulic system in a motor vehicle for operating a friction clutch is described, including a slave cylinder acting upon a spring plate of the clutch, and a manually or automatically operated master cylinder acting upon the slave cylinder. The hydraulic system includes a two-stage spring device.

6 Claims, 3 Drawing Sheets

HYDRAULIC SYSTEM

This claims the benefit of German Patent Application 103 31 415.6, filed 10 Jul. 2003 and hereby incorporated by reference herein.

BACKGROUND

The present invention relates to an hydraulic system in a motor vehicle for operating a friction clutch, including a slave cylinder acting upon a spring plate of the clutch, and a manually or automatically operated master cylinder acting upon the slave cylinder.

Such systems are known and are used in motor vehicles for operating the clutch. The master cylinder may be operated directly or power-assisted by the driver via a pedal, or via an actuator such as an electric motor, for example. A control unit can operate the electric motor upon determining the operating conditions for the clutch. The control can be based on the analysis of appropriate input variables, such as, for example, the engine speed, the position of the fuel metering device, the vehicle speed, the clutch state such as the clutch's thermal condition, and the like, the transmission state and/or an input of the driver's intent. The clutch to be operated is designed in such a way that a pressure plate, which may comprise a flywheel mounted on the crankshaft of the engine, or of the secondary part of a dual-mass flywheel, or of a component attached to one of the former, in cooperation with a friction plate, which is connected to the pressure plate such that it is axially displaceable and rotatable with the pressure plate, secures a clutch disk against the action of a spring plate. The clutch disk is rotatably mounted on the input shaft of the transmission. The slave cylinder acts upon the spring plate, thus engaging and disengaging the clutch. The clutch travel path, initiated by the slave cylinder, from an engaged clutch position, via a slipping clutch, to a disengaged clutch position, exhibits a typical force characteristic of a spring plate, having an initially increasing disengagement force which passes through a maximum value, and subsequently decreases. In order to achieve a more even force characteristic over the clutch disengagement path, different designs of compensation springs on the clutch have been proposed, in particular for self-adjusting clutches. The compensation springs require axial installation space and are partly dependent on the clutch's state of wear with regard to its force deployment, so that compensation for the declining spring plate characteristic is difficult over the clutch's service life. This difficulty is similarly true for push-type and pull-type clutches.

Furthermore, it is known to provide restoring springs for the driver operated pedal. The restoring springs restore the pedal to an initial position, in a non-operated state, while the clutch is engaged.

SUMMARY OF THE INVENTION

An object of the present invention to improve the design of the above-described known clutch design, and/or to provide a space-saving and cost-efficient approach for compensating for an uneven force characteristic typical in a spring plate, over a clutch disengagement path.

The present invention provides an hydraulic system in a motor vehicle for operating a friction clutch having a clutch disk, securable against the action of a spring plate and mounted solidarity rotatably on the transmission input shaft of a transmission, situated between a pressure plate, mounted solidarity rotatably on the crank shaft of an internal combustion engine, and a friction plate. A slave cylinder axially acts upon the spring plate via a mechanical disengagement system thereby disengaging and engaging the friction clutch. A master cylinder operated by a driver or automatically by an actuator system acts upon the slave cylinder. An at least two-stage spring device, in which a first stage, at least partially, compensates for a decreasing characteristic of the spring plate over a clutch disengagement path, and a second stage returns the master cylinder to its normal position with the friction clutch being engaged, is provided in the hydraulic system.

The first stage is advantageously situated in the hydraulic system itself and not on the friction clutch. At least the second stage may be mountable in a space-saving manner in one of the components, in the master cylinder or in the slave cylinder, for example.

It may be particularly advantageous to mount the first stage in the pressure chamber of the master cylinder in the form of an energy accumulator, this energy accumulator being axially acted upon by a piston of the master cylinder in a second section of the piston's travel path, while the first section of the piston's travel path is covered without the piston acting upon the energy accumulator. The first section is advantageously designed in such a way that the energy accumulator is not acted upon prior to reaching the maximum of the spring plate's force characteristic. As originally provided in this embodiment, the second stage may be situated in the pedal area, as a helical spring, for example, the first stage deploying its effect in the second section of the piston's travel path and the second stage deploying its effect in the first section of the piston's travel path.

In accordance with another embodiment of the present invention, the master cylinder includes a pressure chamber, and a pressure piston mounted within the pressure chamber for axial movement within the pressure chamber through first and second sections of a travel path. Moreover, the first stage is mounted in the pressure chamber of the master cylinder, and is axially engaged by the pressure piston during the second section of travel.

In yet a further embodiment of the present invention, the master cylinder includes a pressure chamber, and a pressure piston is mounted within the pressure chamber for axial movement within the pressure chamber. In accordance with a feature of the embodiment of the present invention, the first stage and the second stage comprise at least one energy accumulator mounted within the master cylinder, and having sections of differing spring characteristics.

BRIEF DESCRIPTION OF THE DRAWINGS

The present invention is explained in greater detail on the basis of FIGS. 1 through 3, in which.

DETAILED DESCRIPTION OF THE PREFERRED EMBODIMENTS

Figure 1:
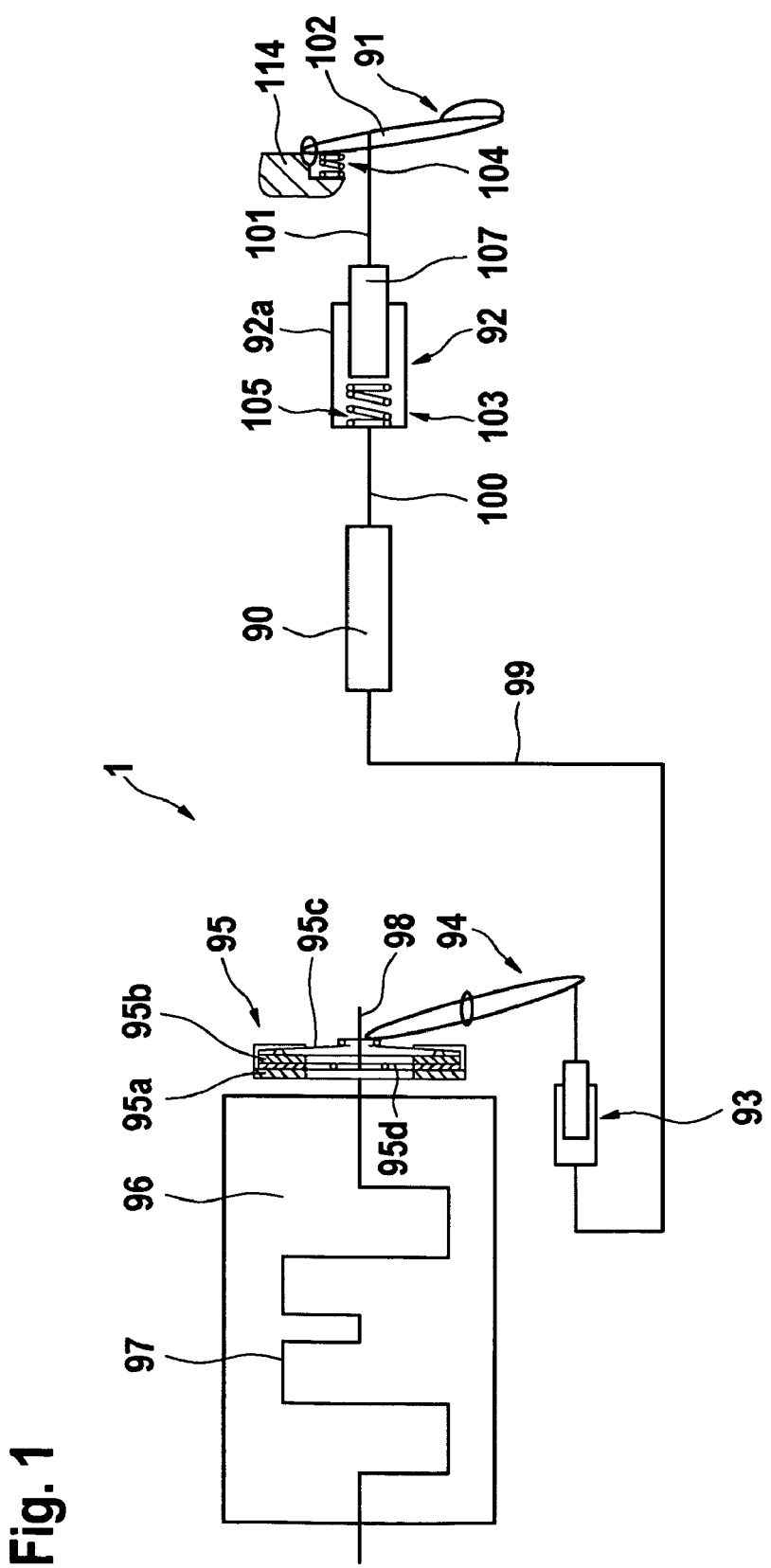
FIG. 1 is a schematic view of a friction clutch hydraulic system, according to an exemplary embodiment of the present invention.

Referring now to the drawings, and initially to FIG. 1, there is illustrated a schematic view of a friction clutch hydraulic system, according to an exemplary embodiment of the present invention. A clutch disengagement system 91 comprises a master cylinder 92 and a slave cylinder 93. A pressure-limiting valve 90 is optionally installed between lines 99, 100. The lines 99, 100, in turn, connect the slave cylinder 93 to the master cylinder 92.

As shown in FIG. 1, the clutch disengagement system 91 is arranged to disengage a friction clutch 95 via an operating element 102 mounted to operate upon the master cylinder 92. The operating element 102 may comprise, for example, a foot pedal, an actuator, an electric actuator, or the like. The operating element 102 is returned to a normal position via a second stage 104 of a two stage spring device according to an exemplary embodiment of the present invention. The second stage 104 can comprise, for example, in the present embodiment, an energy accumulator spring mounted between a housing 114, pivotally supporting the foot pedal comprising the operating element 102, and the operating element 102, itself, as clearly illustrated in FIG. 1.

Utilizing a mechanical device, such as a rod 101, the operating element 102 can apply pressure to the master cylinder 92. Moreover, the rod 101 causes the master cylinder 92 to return to a normal position, when the friction clutch 95 is engaged, due to the action for the second stage 104 upon the operating element 102, as described above. The pressure applied to the master cylinder 92 is, in turn, applied to the slave cylinder 93 via the line 100, the pressure-limiting valve 90, and the line 99. As shown in the embodiment illustrated in FIG. 1, the slave cylinder 93 may be situated parallel to a transmission input shaft 98 and, via a mechanical disengagement lever 94, may act on a spring plate 95c for an axial displacement movement. Other exemplary embodiments may provide a slave cylinder concentrically situated around transmission input shaft 98, the slave cylinder's piston acting upon the spring plate 95c via a disengagement bearing. To generate the disengagement force, the slave cylinder 93 is fixedly attached to a transmission housing (not shown) or to another component fixedly attached to the housing. When the clutch 95 is engaged, the transmission input shaft 98 transfers the torque of an internal combustion engine 96, via a crankshaft 97, to a transmission (not shown), and subsequently to the driving wheels of a motor vehicle, as is generally known in the art.

Due to axial displacement of the spring plate 95c, caused by the pressure applied by the slave cylinder 93, a pressure plate 95b, which is axially displaceable relative to a friction plate 95a, is lifted, thereby separating a clutch disk 95d from the power flow of the internal combustion engine 96. The engaged state of the clutch 95, associated with maximum torque transfer is followed, with an increasing clutch disengagement path, by a slip operation of the clutch 95, resulting in a transfer of a partial torque. The force/path characteristic of the spring plate 95c along the clutch disengagement path is such that, in the case of short clutch disengagement paths, a disengagement force increases with increasing disengagement distance, and culminates in a maximum disengagement force. However, after crossing the maximum, the disengagement force decreases with a further increasing clutch disengagement path.

According to a feature of the present invention, to at least partly compensate for this decreasing disengagement force, a first stage 103 of the spring device of the present invention, is provided. As shown in FIG. 1, in the exemplary embodiment, the first stage 103 comprises a spring. In the preferred embodiment of the present invention, the first stage 103 is mounted in a housing 92a of the master cylinder 92. The first stage 103 is mounted in such a way that a piston 107 of the master cylinder 92 is initially spaced from the first stage 103, and axially moved from its original position by action of the rod 101, without engaging the first stage 103. After traveling through a section of the housing 92a, the piston 107 engages and compresses the energy accumulating spring of the first stage 103. The force necessary for the piston 107 to move into engagement with the first stage 103 is at levels that occur in the clutch disengagement path that are during or after passing through the disengagement force maximum of the spring plate 95c. Thus, the force exerted by the first stage 103, when engaged by the piston 107, in the case of longer clutch disengagement paths, is added to the now decreasing disengagement forces of the spring plate 95c. In this manner, on the side of the master cylinder 92 engaged by the operating element 102, a more even disengagement force is noticeable than would be the case without force compensation due to the first stage 103.

Pursuant to the described embodiment of the present invention, the first stage 103 is mounted in the hydraulic system itself, for example, in the master cylinder 92, rather than in the friction clutch 95. The first stage 103 is arranged such that the energy accumulator function of the first stage 103 does not occur prior to the spring plate 95c reaching the maximum value of the force characteristic, and occurs during the decreasing force portion of the force characteristic. Moreover, the second stage 104, in the exemplary embodiment of FIG. 1, is mounted in the area of the foot pedal operating element 102, as a helical spring. The spring of the second stage 104 is engaged and effective during the initial movement of the piston 107, and the first stage 103 is effective after the spring plate 95c reaches the maximum force of the force characteristic.

Figure 2:
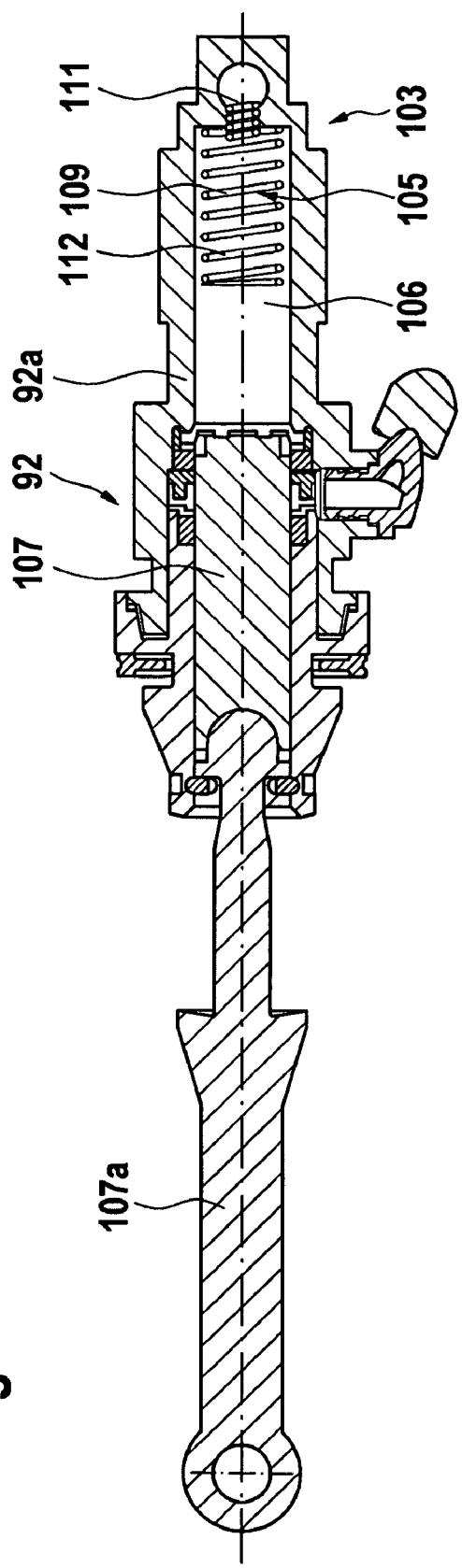
FIG. 2 shows an exemplary embodiment of a master cylinder for the hydraulic system illustrated in FIG. 1.

Referring now to FIG. 2, there is shown an exemplary embodiment of a master cylinder 92 for the hydraulic system illustrated in FIG. 1. The housing 92a of the master cylinder 92 forms a pressure chamber 106 in which the piston 107 is axially displaceable, in a sealed relation to the housing 92a. The operating element (not shown in FIG. 2) engages piston rod 107a, which is coupled to the piston 107. As shown in FIG. 2, the piston 107 is initially spaced from the spring 105 of the first stage 103, and moves through a portion of its travel path, starting from the indicated original position, without engaging energy accumulator spring 105 of the first stage 103. The second stage 104 (see FIG. 1) is at least partially effective during this portion of travel, supporting piston 107 against the action of the spring plate 95c toward the disengaged position of the clutch 95. It is to be understood that in specific exemplary embodiments both stages of the spring device may overlap or there may be a travel path in which neither of the two stages is effective.

After completing the first section of travel, the piston 107 engages and acts upon the energy accumulator 105 of the first stage 103, which, in the exemplary embodiment of the present invention, comprises a helical compression spring 109. The spring 109 acts to enhance the disengagement force of the spring plate 95c, when engaged by the piston 107. In the exemplary embodiment shown, the helical compression spring 109 has two sections 111, 112. The springs 111, 112 may be wound on different diameters, so that the first section 111, with a first diameter may be provided for the deployment of the desired spring force, and the second section 112, may be provided for receiving and centering the helical compression spring 109 in the housing 92a.

Figure 3:
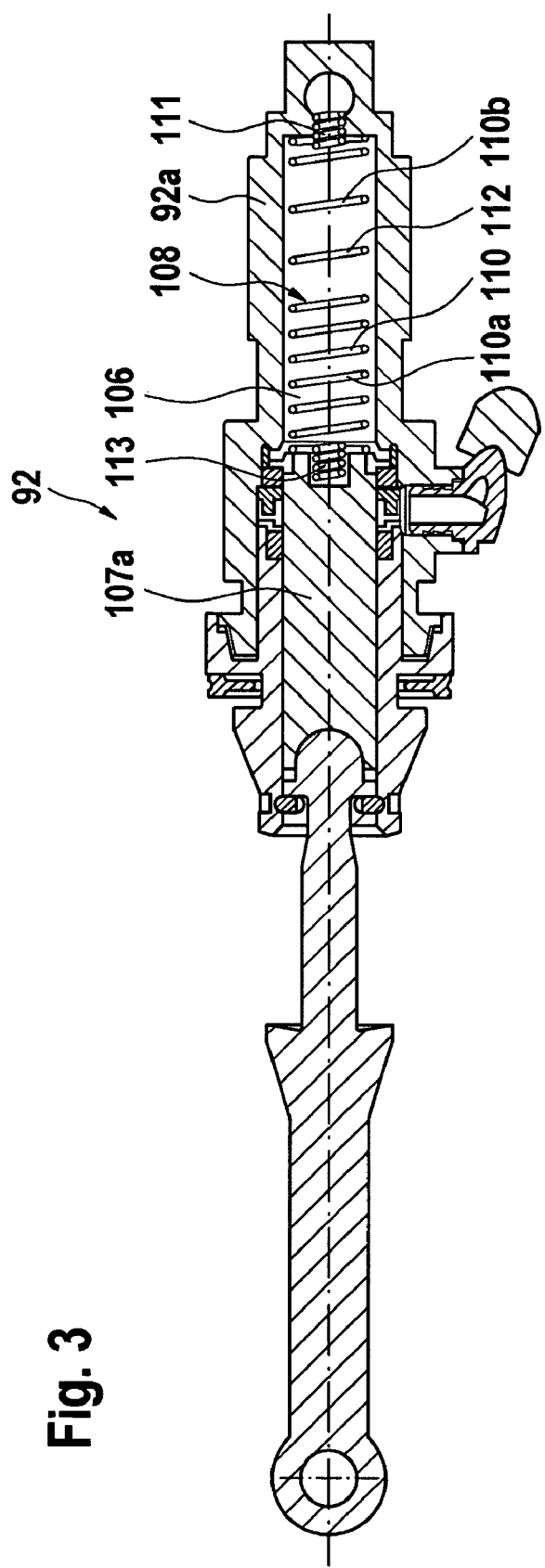
FIG. 3 shows an additional exemplary embodiment of a master cylinder for the hydraulic system illustrated in FIG. 1.

Referring now to FIG. 3, there is illustrated an additional exemplary embodiment of a master cylinder 92 for the hydraulic system illustrated in FIG. 1. FIG. 3 shows a master cylinder 92, identical to master cylinder 92 in FIG. 2, the difference being that a single energy accumulator 108 is provided to act as both stages of the present invention. An exemplary embodiment of a single energy accumulator for both stages comprises a single helical spring having two spring constants, and arranged to be mounted within the master cylinder 92. This arrangement reduces the total number of components to achieve the functionality of the two stage arrangement of the present invention. A helical spring according to the embodiment of FIG. 3 may have, for example, varying coil diameters, varying materials, and/or varying number of turns per unit length, to form the two stages 103, 104. It is advantageous to select the spring constant of the first stage 103, for compensating for the decreasing force of the spring plate 95c, being larger than the spring constant of the second stage 104, for returning the pedal comprising the operating element 102.

As shown in FIG. 3, and according to a feature of the present invention, the energy accumulator 108 comprises a helical compression spring 110, positioned within the pressure chamber 106 and connected to piston 107a via a spring section 113, as well as to housing 92a via a spring section 111. Moreover, according to the exemplary embodiment illustrated in FIG. 3, the helical spring 110 comprises two sections 110a and 110b which, due to their different turns per length ratio, have different spring constants. The spring constants of sections 110a, 110b are adapted to corresponding force requirements, as follows. It has been shown that for a pedal return function (104; 110b), a smaller spring constant is necessary, i.e., smaller forces per path unit, than is the case in the first stage (103; 110a) which is arranged to compensate for the decreasing force characteristic of the spring plate over the clutch disengagement path.

It is to be understood that instead of push-type clutches, as described in the exemplary embodiments, the same means according to the present invention may also be advantageous in pull-type clutches in which the slave cylinder, under pressure by the master cylinder due to the reversal of the force acting upon the slave cylinder piston, pulls on the spring plate, thereby disengaging the clutch.

What is claimed is:

1. An hydraulic system in a motor vehicle for operating a friction clutch, the friction clutch having a clutch disk, a friction plate, a pressure plate and a spring plate, the clutch disk being securable via an action of the spring plate and mounted to rotate with a transmission input shaft of a transmission of the motor vehicle, the clutch disk being situated between the pressure plate mounted to rotate with a crankshaft of an internal combustion engine and the friction plate, a mechanical disengagement system being connected to the spring plate for disengaging and engaging the friction clutch, the hydraulic system comprising:

a slave cylinder axially acting upon the spring plate via the mechanical disengagement system for disengaging and engaging the friction clutch;

a master cylinder operated by a driver or automatically by an actuator system, the master cylinder having a housing and acting upon the slave cylinder; and the master cylinder including an at least two-stage spring device having a first stage and a second stage, the first stage compensating, at least partially, for a decreasing characteristic of the spring plate over the clutch disengagement path, and the second stage returning the master cylinder to a normal position with the friction clutch being engaged, the spring device including a single helical compression spring with a first section of a constant first diameter and a second section of a constant second diameter, the first diameter being different than the second diameter.

2. The hydraulic system as recited in claim 1 wherein the master cylinder includes a pressure chamber, and a pressure piston mounted within the pressure chamber for axial movement within the pressure chamber through first and second sections of a travel path, and wherein the first stage is mounted in the pressure chamber of the master cylinder, and is axially engaged by the pressure piston during the second section of travel.

3. The hydraulic system as recited in claim 1 wherein the master cylinder includes a pressure chamber, and a pressure piston mounted within the pressure chamber for axial movement within the pressure chamber.

4. The hydraulic system as recited in claim 1 wherein a spring constant of the first stage is greater than a spring constant of the second stage.

5. The hydraulic system as recited in claim 1 wherein at least one of the first and second sections is arranged and configured to be a centering device.

6. An hydraulic system in a motor vehicle for operating a friction clutch, the friction clutch having a clutch disk, a friction plate, a pressure plate and a spring plate, the clutch disk being securable via an action of the spring plate and mounted to rotate with a transmission input shaft of a transmission of the motor vehicle, the clutch disk being situated between the pressure plate mounted to rotate with a crankshaft of an internal combustion engine and the friction plate, a mechanical disengagement system being connected to the spring plate for disengaging and engaging the friction clutch, the friction clutch having a clutch disengagement path with a required disengagement force increasing to a disengagement force maximum and then decreasing, the hydraulic system comprising:

a slave cylinder axially acting upon the spring plate via the mechanical disengagement system for disengaging and engaging the friction clutch;

a master cylinder operated by a driver or automatically by an actuator system, the master cylinder having a housing and acting upon the slave cylinder; and an at least two-stage spring device having a first stage and a second stage, the first stage compensating, at least partially, for a decreasing characteristic of the spring plate over the clutch disengagement path, the first stage first compensating for the decreasing characteristic during or after the disengagement force maximum has been reached, and the second stage returning the master cylinder to a normal position with the friction clutch being engaged, wherein the master cylinder includes a helical spring having a first section and having a second section with a different diameter than the first section.

* * * * *